July 26, 1938.   W. E. URSCHEL ET AL   2,124,935
FRUIT AND VEGETABLE CUTTER
Filed June 8, 1936   5 Sheets-Sheet 1

INVENTORS.
William E. Urschel
Joe Richard Urschel
By: Cox & Moore  ATTORNEYS.

July 26, 1938.  W. E. URSCHEL ET AL  2,124,935
FRUIT AND VEGETABLE CUTTER
Filed June 8, 1936  5 Sheets-Sheet 2
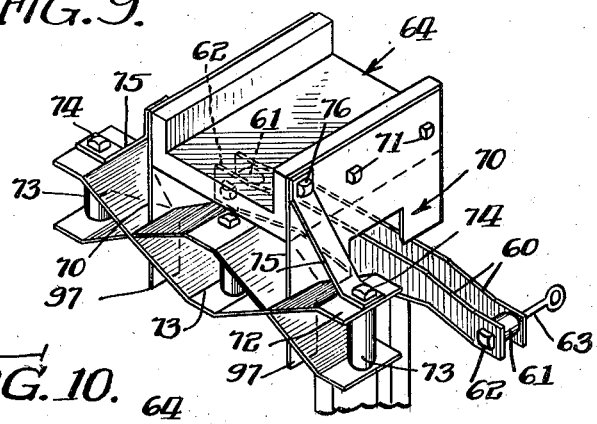
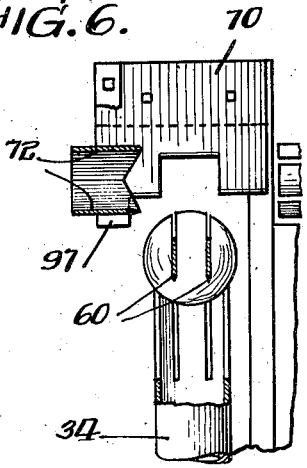
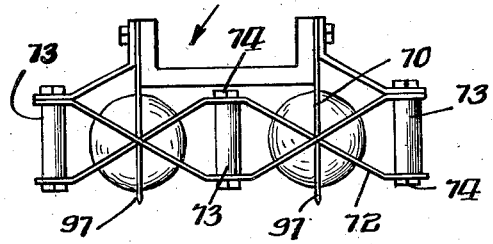
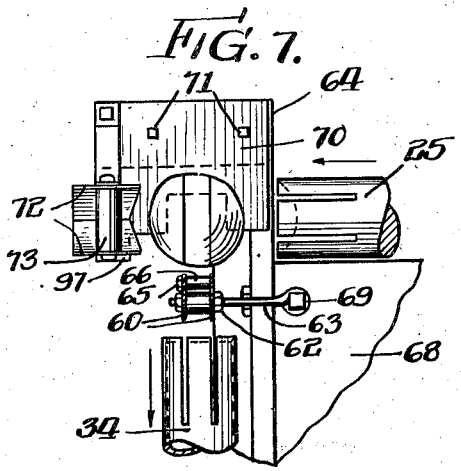
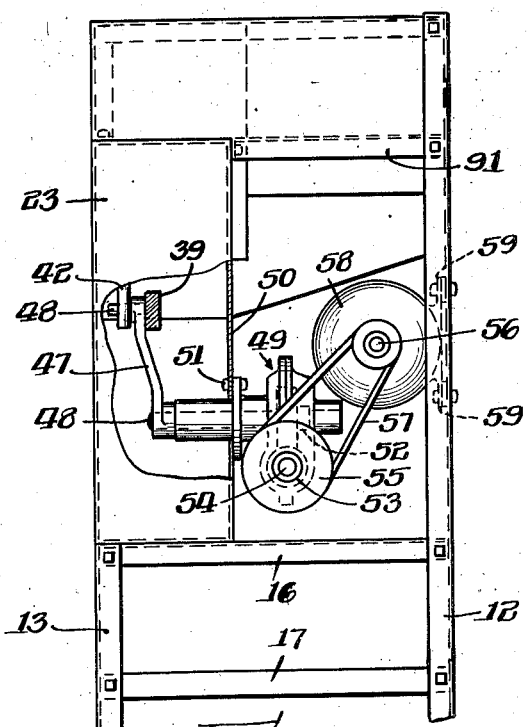
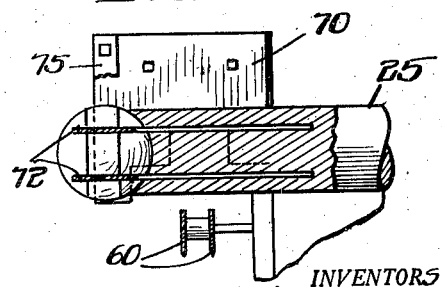
INVENTORS
William E. Urschel
Joe Richard Urschel
By:- Cox & Moore  ATTORNEYS.

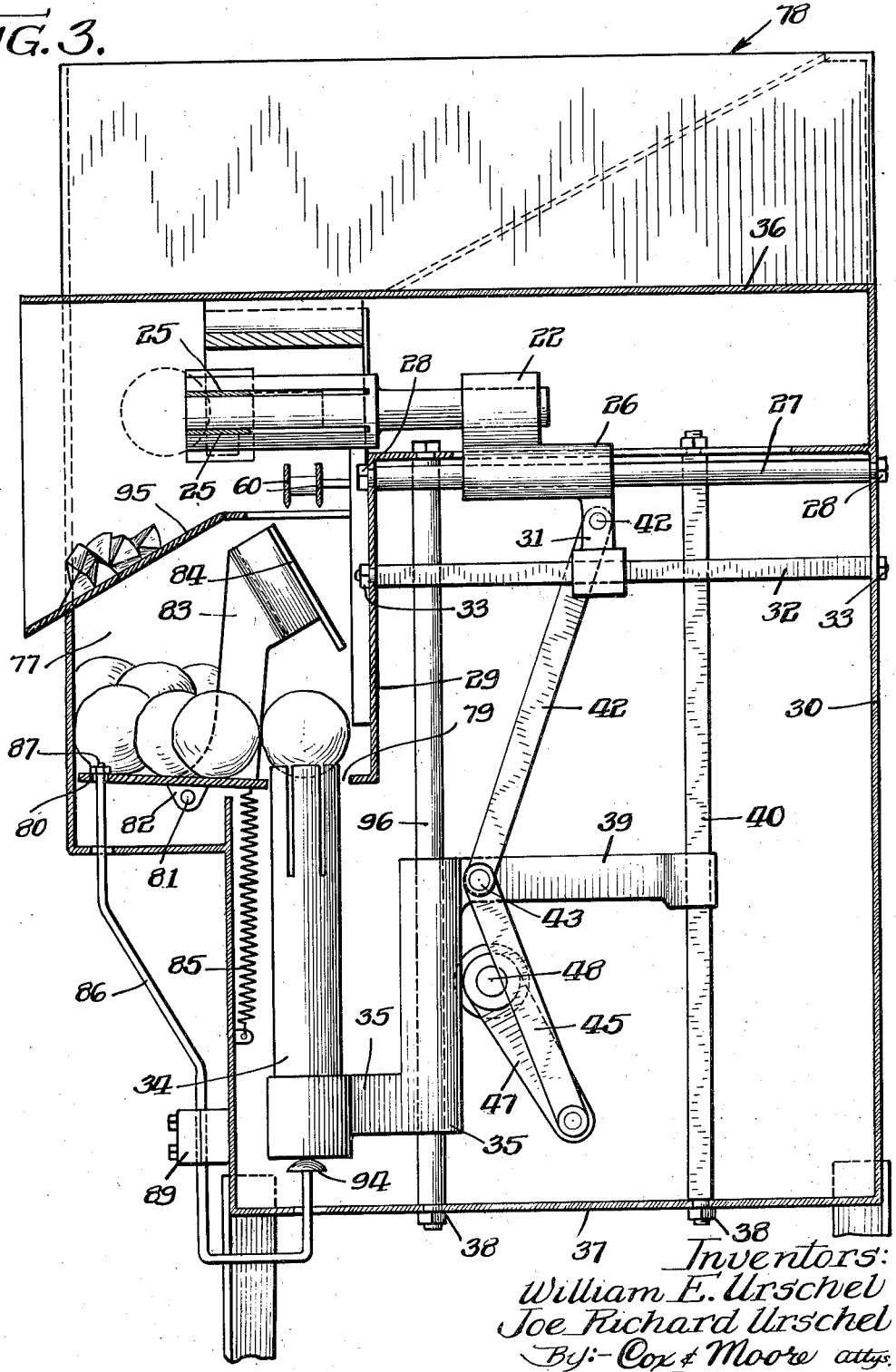

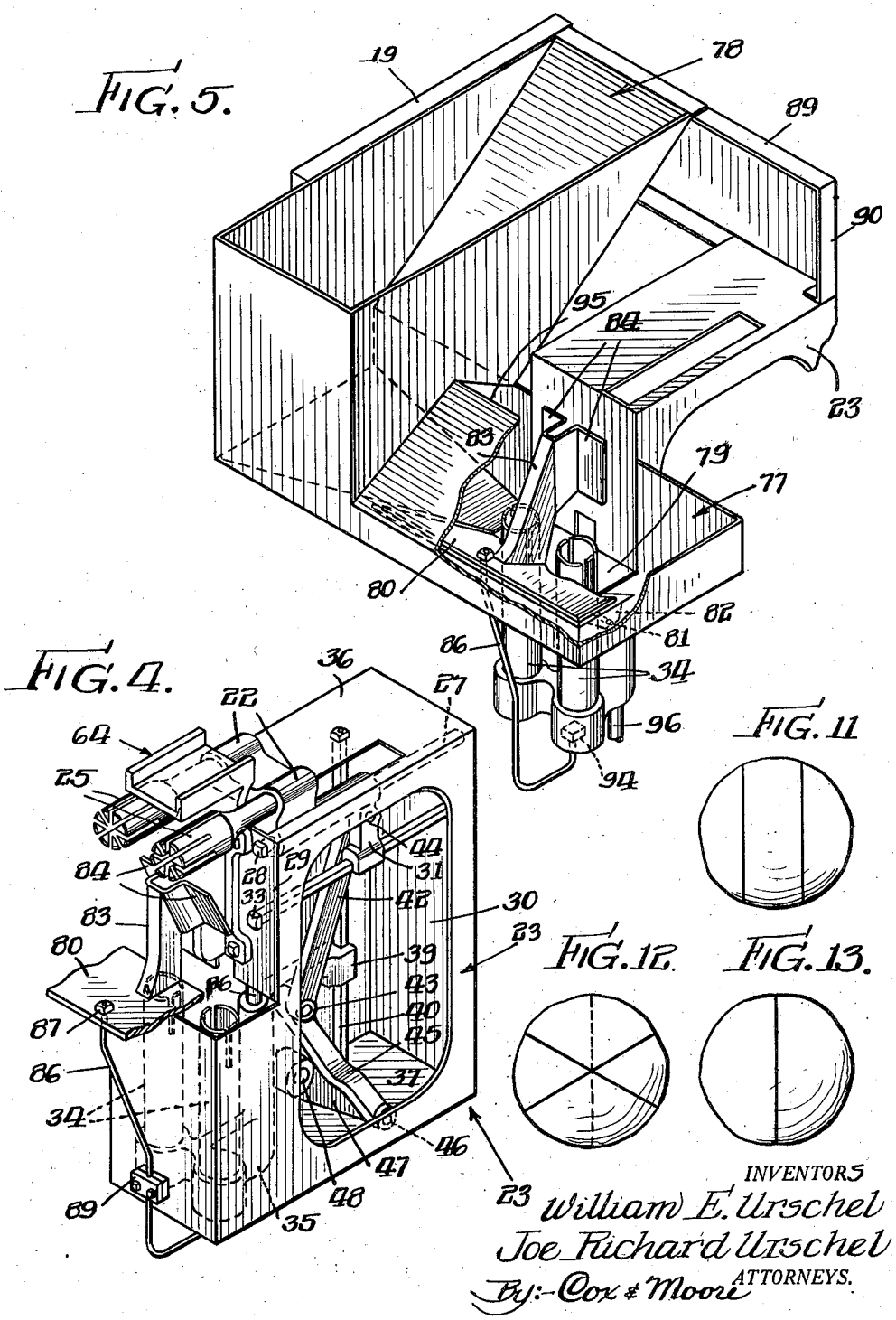

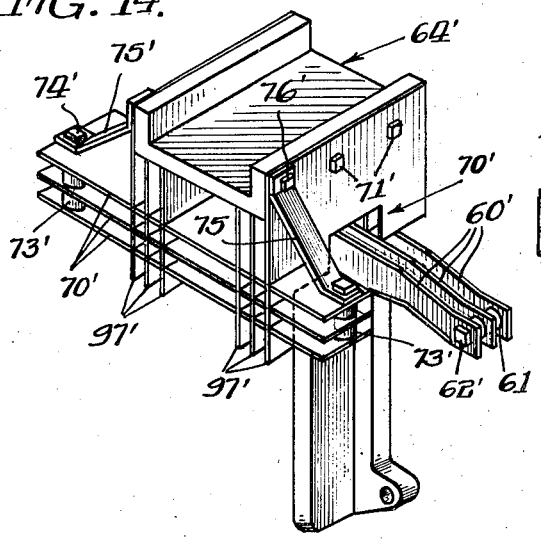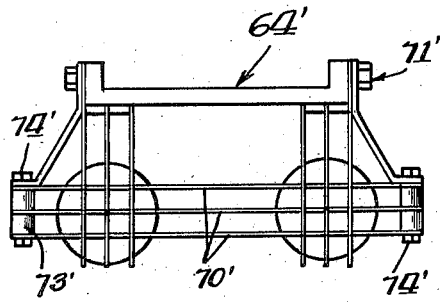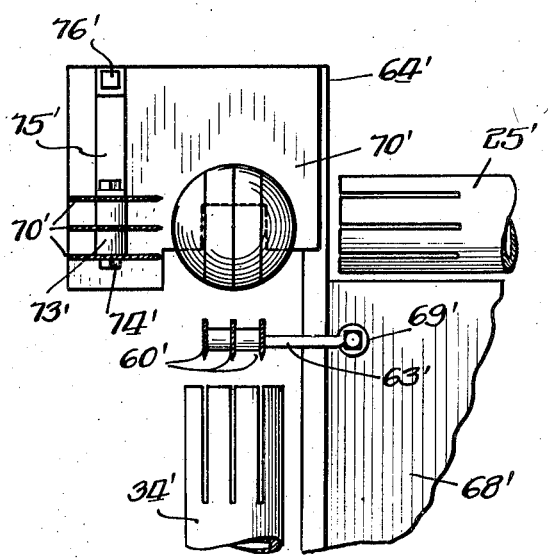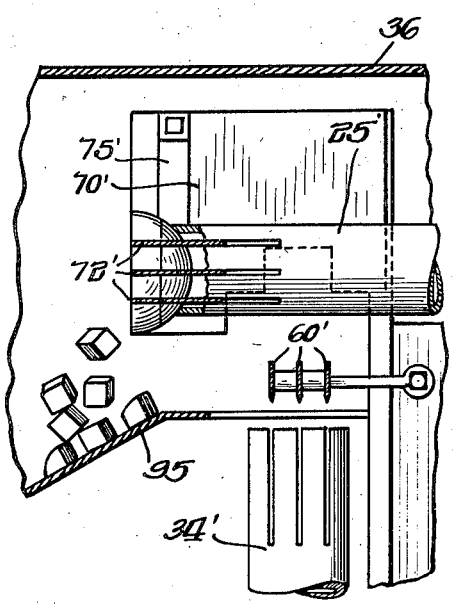

Patented July 26, 1938

2,124,935

UNITED STATES PATENT OFFICE 2,124,935

FRUIT AND VEGETABLE CUTTER

William E. Urschel and Joe Richard Urschel, Valparaiso, Ind.

Application June 8, 1936, Serial No. 84,136

12 Claims. (Cl. 146—78)

This invention relates to an apparatus for cutting fruits and vegetables and other commodities.

Among the objects of the present invention are to provide an apparatus for cutting fruits, vegetables, and other commodities into a plurality of symmetrically arranged pieces; to provide an apparatus for cutting a whole fruit or vegetable into a plurality of relatively smaller pieces; to provide an apparatus for cutting a whole beet, apple, or the like into as many as eighteen pieces in an automatic manner; to provide a dicing apparatus for fruits or vegetables; to provide an automatic apparatus for cutting fruits and vegetables into a plurality of selected shapes or pieces by means of a plurality of interchangeable cutters; to provide an automatic apparatus wherein a plurality of whole fruits or vegetables or relatively large sections thereof may be dumped into one part of the machine and wherein they will be projected from the machine completely and automatically cut into a plurality of pieces of desired shape and size; to provide these and other objects of the invention which will be apparent from a perusal of the following specification when taken in connection with the accompanying drawings, wherein:

Figure 2 is a side view showing certain parts of the driving mechanism of the machine;

Figure 3 is a vertical cross-section of the machine taken on line 3—3 of Figure 1;

Figure 4 is a perspective view of the plunger operating means;

Figure 5 is a perspective view of the feed hopper and agitator with portions of the frame broken away;

Figure 1:
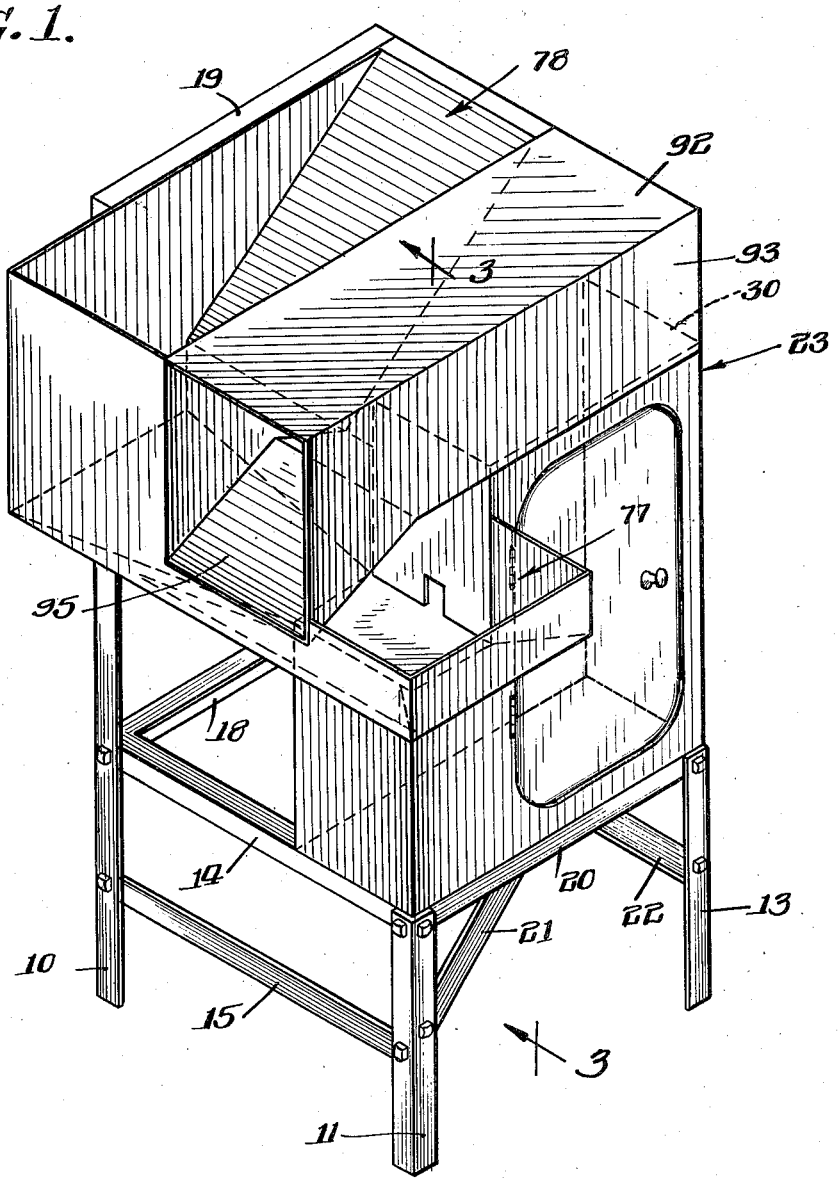
Figure 1 is a general view of the preferred embodiment of one form of our improved apparatus.

Figures 6, 7, and 8 are sectional views showing different steps in the cutting operation;

Figure 9 is a perspective view of the cutting knives;

Figure 10 is a front elevational view of the diagonal cutting knives;

Figures 11, 12, and 13 are elevational views of the material showing the three different cuts it receives by the knives shown in Figures 6, 7, and 8 respectively; and Figures 14, 15, 16 and 17 show the knives arranged to dice the fruits or vegetables and the manner in which the material is discharged from the machine.

In the preferred form of the invention we provide an upstanding frame of preferably general box-like construction, the frame being arranged to provide an intake chute or feed trough into which fruits, vegetables or other commodities to be cut are fed either by hand or by means of a conveyor.

The commodity receiving hopper is shaped to pass the commodity by gravity to the first cutting station at which are disposed means for producing a relative movement between the first cutting knives and the commodity whereby to cause the cutting knives to pass through the commodity to form a cut, the cut being formed in predetermined planes at spaced distances apart through the commodity, as the fruits or vegetables.

In the present instance we have illustrated the invention as applied to the cutting of whole fruits or vegetables, such as beets, apples, and the like. The beets or apples or other commodity are fed while in whole state or condition into the hopper from which points they will roll down to the cutting station onto the tops of vertical plungers which are elevated to pass the whole fruits or vegetables vertically upwardly so that knives, preferably stationary, and arranged in spaced apart relation operate to form vertically arranged cuts through the beets or apples or other commodity. In sequential fashion, a relative movement is then produced between the cut beets, apples, or other commodity, and a second set of cutting knives arranged such that the commodity is moved in a direction angularly disposed with respect to its first direction of movement whereby to effect a cutting of the commodity at an angle to the first cut and preferably at a right angle.

By arranging the first and second sets of knives in desired fashion, any type of cut may be made in the commodity.

Referring now to the drawings in detail, the machine is supported by two forward legs 10 and 11 and two rearward legs 12 and 13 (see Figures 1 and 2). The forward legs 10 and 11 are spaced apart by the lateral members 14 and 15. Additional lateral members 16 and 17 space the rearward legs 13 and 14. Longitudinal members 18, 19, and 20, bolted to the legs 10, 11, 12, and 13 respectively, form the side members of the frame.

A rectangularly shaped receptacle 23 (see Figure 4) is preferably formed from wall portions of sheet metal whereby to enclose a major portion of the moving parts of the machine. The metal walls are secured in any conventional manner to the frame members 14, 16, and 20 and provide a rectangular opening 24 affording access to the enclosed machinery hereinafter described.

Means is provided for affording a relative movement between the commodity to be cut and the cutters. In the present instance we provide this means by a plurality of plungers, preferably disposed angularly with respect to each other, whereby to impart sequential movements to the commodity in directions angularly disposed with respect to each other. For instance, horizontal plungers 25, Figure 3, are conventionally secured in a cross-head 26 reciprocably mounted upon a rod 27. Screws 28 serve to secure this rod 27 to wall portions 29 and 30 of the receptacle 23. Arms 31 projecting downwardly from the rearward portion of the cross-head 26 are provided with a rectangular groove designated to cooperate with a guide rod 32. This arrangement of parts serves to hold the plungers 25 in a horizontal plane.

Screws 33 engage the threaded apertures provided at the extremities of the rod 32 so as to secure the rod to faces 29 and 30 of the receptacle 23.

In addition, vertical plungers 34 are provided, the same being conventionally secured in a cross-head 35 which is reciprocably mounted on rod 96. This latter rod is secured to the upper and lower surfaces 36 and 37 of the receptacle 23 by means of suitable screws 38 engaging with the threaded apertures at each extremity of the rod 96.

In addition, a rearwardly extending arm 39 integral with the upper end of the extended hub of the cross-head 35 is provided with a rectangular groove designed to cooperate with a vertical guide rod 40. Arm 39 reciprocating upon guide rod 40 serves to hold plungers 34 in a plane normal to the rods 27 and 32. Screws 41 secure the guide rod 40 to walls 36 and 37 of the receptacle 23 in the same manner as rod 36 is secured to said walls.

Motion of the cross-head 35 is transferred to the cross-head 26 by means of a link mechanism 42 pivotally mounted upon pins 43 and 44 secured to each of the respective plunger heads. Link 45 pivotally mounted on pins 43 and 46 connects plunger head 34 with crank 47. This latter crank is pinned on shaft 48 (see Figure 2), which latter is journaled in the gear housing 49 bolted to wall 50 of the receptacle 23 by bolts 51. Worm gear 52 enclosed by the housing 49 is keyed to shaft 48 and is driven by worm gear 53 pinned to a shaft 54 also journaled in housing 49. A V-grooved pulley 55 keyed to one extremity of shaft 54 is driven by the motor pulley 56 by means of the V-belt 57. Motor 58 is bolted to the two transverse motor supports 59 which in turn are secured to the two rear frame supports 12 and 13.

Cutting means is provided for cutting the commodity into selected shapes of desired number, for instance, in cutting beets, apples, vegetables or fruits be they whole vegetables or fruits or large sections thereof, the knives may be arranged as desired. In the machine illustrated in our present invention we have provided three sets of knives or cutters, shown in detail in Figures 3, 7, 9, 10, and 11 to 14.

The first set of knives in Figures 3 to 10 are designated at 60 and lie in a vertical plane parallel to and equi-distant from a vertical plane passing through the centers of both vertical plungers 34. These knives 60 are held in parallel rigidity by means of spacers 61 and nuts 62 positioned upon eyebolts 63 located at each extremity of the knives. These knives 60 are secured to knife holder 64 by means of screws 65. Spacers 66 prevent screws 65 from forcing the knives 60 out of parallel alinement. Eyebolts 63 are secured to faces 50 and 68 of receptacle 23 by bolts 69.

The second set of knives is shown at 70. These knives lie in vertical parallel planes passing through the centers of plungers 34 and normal to a vertical plane passing through both centers of plungers 34. These knives 70 are journaled to holder 64 by screws 71.

The third set of knives 72 have their cutting edges in intersecting planes extending radially through the longitudinal centers of each horizontal plunger 25. Slots at the intersecting points of the knives 72 to 70 allow said knives to overlap or mesh at these points. Spacers 73 and bolts 74 hold the knives in spaced relation. Braces 75 secured at one end to holder 64 by screws 76 and at their other extremities to knives 72 by bolts 74 hold the knives 72 in a fixed position.

The feed hopper

The feed hopper is divided into two sections; a main hopper 77 (see Figure 5), which is transversely disposed, and a supplementary hopper 78, which is disposed longitudinally upon the main frame. The sloping surfaces of both hoppers 77 and 78 are inclined in such a manner as to direct any fruits or vegetables placed therein toward and into opening 79 through which the vertical plungers 74 reciprocate. Agitator means 80 is provided in the hopper 77 to insure a constant movement of the fruits or vegetables in said hopper. This agitator 80 is preferably constructed as pivotally mounted upon a rod 81, in turn rigidly mounted at each extremity in brackets 82 secured to the lower side of hopper 77. An upwardly extending arm 83 of agitator 80 is equipped with two transversely extending arms 84. Agitator 80 is maintained in position, illustrated for instance in Figure 2, by a tension spring 85, conventionally secured at the lower end of arm 83. The other extremity of spring 85 is secured to the frame. Rod 86 reciprocably mounted in the bearing 87 which in turn is bolted to the forward wall of receptacle 23 has its upper extremity protruding through a circular aperture in the agitator 80. A nut 88 secured to the protruding portion of this rod 86 has a preferably spherically shaped lower surface to permit evenly distributed contact with the agitator 80 at any angular position of said agitator. A lower portion of rods 86 extends rearwardly and then upwardly and upon said lower vertical extremity is positioned a block 94. Cross-head 35 comes into contact with block 94 as it approaches its lower position, thus transmitting motion to rod 86 which in turn exerts a downward pressure to agitator 80. As plunger head 35 reverses its direction of travel, i. e., moving upwardly, the resilient tension of spring 85 causes agitator 80 to resume its former position as illustrated in Figure 6. In the event that more than one fruit or vegetable becomes lodged upon either plunger 34, the surplus vegetables or fruits are forced off by arms 84 which move with agitator 80. This is due to the fact that arm 83 is integral with said agitator.

We have also provided an additional support for hopper 78 by means of a transverse member 89, see Figures 2 and 4, and a vertical member 90 secured to member 91 and receptacle 23 respectively. The transverse member 91 bolted to the upper rear corner wall of the receptacle 23 and leg 12 serves to add rigidity to the wall structure. Two top and side members 92 and 93 (see Figure 1) are provided to house the horizontal plunger 25 and are fitted in such a manner as to facilitate their easy removal for inspection or repair of the enclosed parts.

Operation

To operate our improved apparatus, fruit, vegetables, or other commodities are placed in the longitudinal hopper 78. The sloping surfaces of the hopper thus cause the vegetables or fruits to flow or roll into the transverse hopper 77. The sloping surfaces of hopper 77 aided by the action of agitator 80 cause the vegetables or fruits to drop into the opening 79 of the receptacle 23 when the vertical plungers 34 are in their lowermost position, as for instance illustrated in Figure 3. At this time shaft 48 is driven by motor 58 (Figure 2) and through pulleys 55, 56, V-belt 57 and the worm and worm gear 52 and 53, and actuates crank 47.

The force exerted by crank 47 is transmitted to the vertical cross-head 35 by link 45 thereby causing head 35 to reciprocate upon the rod 36. Motion is transmitted from plunger head 35 to cross-head 26 by means of link 42.

Fruits or vegetables can not enter opening 79 until the upper extremities of plungers 34 are below the rim of said opening, thus allowing but one vegetable or fruit to rest upon the upper rim of plungers 34 at one time. If another vegetable or fruit should superimpose itself upon the one already on the plunger 34, it is removed or brushed off by arm 84 secured to the arm 83 integral with agitator 80. As hereinabove noted, agitator 80 is operated by cross-head 35 coming in contact with block 94 positioned on the lower extremity of actuating rod 86. Agitator 80 is pulled back to its original position as the plunger head raises through the action of the hereinbefore described spring 85.

The fruits or vegetables moving upwardly upon plungers 34 are impinged or forced against knives 60, thereby cutting them, in the present instance, into three pieces (see Figure 7). It will be noted that as the plungers 34 carry the whole apple or beet, for instance, upwardly past the knives 60, the knives will form a complete vertical series of cuts disposed in spaced-apart relation through the apple or beet. The vertical knives 60 passing into the slots of the plungers 34 and since the curved wall of the beet or apple is resting upon the open upper end of the plunger, the cut sections will be held together so that the apple or beet will maintain its original whole shape even through vertical lines of severance are formed completely therethrough. In this condition the plunger 34 continues upwardly to carry the thus severed whole beet, apple or other fruits or vegetables into contact with the transversely disposed, spaced-apart knives 70. By reference to Figure 7 it will be seen that the upward movement of plungers 34 carry the commodity upwardly such a distance that the knives 70 make a vertical cut from the upper portion of the commodity extending downwardly through but not passing completely through the commodity, as an apple or beet.

In Figure 7, the lower cutting edges of the knives 70 are shown as being approximately midway through the apple or beet. Thus the apple or beet is impaled upon the space knives 70 in the manner shown in Figure 7. At this time the plungers 34 reverse their course and proceed downwardly. Simultaneously or sequentially, as provided, the plunger 34 has moved out of the way, the horizontal plungers 25 then move forwardly and come into contact with the fruits or vegetables left upon the knives 70. These plungers 25 thus move the whole fruit or vegetable in a direction angularly disposed with respect to the first directional movement of the commodity as it was formerly moved by the plungers 34. In other words, the plungers 25 move the beet or apple transversely against the third set of knives 72.

It will be noted that the downwardly extending portions 97 of the second set of knives 70 then function to complete the unfinished cuts which were commenced by the knives 70 when the apple or beet was forced upwardly thereagainst by the plungers 34. In addition, the knives 72 simultaneously cut oblique slices completely through the apple or beet, the plungers 25 forcing the apple or beet therethrough so that the severed pieces fall upon the discharge chute 95 (see Figures 1 and 3). This discharge chute 95 diverts the severed pieces of fruit into a conveyor or any other suitable receptacle.

Although the knives shown cut the spherical or substantially spherically shaped fruits or vegetables first into segments and zone shaped pieces and then each zone or segment into substantially six wedge-like pieces, any other desired arrangement of knives may be used. For instance, to cut radial or orange slices the transverse knives 60 are removed.

In Figures 11 and 14 we have shown an arrangement of knives which may be utilized to cut dices by having a multiple series of parallel knives 60' spaced at the dice width desired, adding additional knives 70' disposed angularly with respect to each other, whereby to provide the dice cutting arrangement shown.

To quarter or cut vegetables or fruits in four pieces, knives 72 may be removed and but one knife 60 is used. In desired instances the slots in the plungers 25 and 34 must be changed to correspond with the knife arrangement desired.

Having thus described our invention, what we claim as new and desire to secure by Letters Patent of the United States is:

1. An apparatus for cutting fruits, vegetables and other commodities which comprises a first set of parallel disposed, spaced-apart blades, a second set of parallel spaced-apart blades extending angularly across and in spaced-apart relation to the first mentioned set of blades, a plunger adapted to receive a relatively large portion of the commodity to be cut thereon, said plunger having slots therein to receive the first mentioned set of blades whereby to permit said commodity to be projected entirely across said first mentioned set of blades while holding the severed sections thereof in position, means for actuating said plunger whereby to force said commodity across said first mentioned set of blades and to impale the cut commodity partially upon said second angularly disposed set of blades, a third set of blades disposed to lie across the parallel planes of said second set of blades and a second plunger having slots therein adapted to register with the blades of the second and third set, means for actuating said second plunger to push the commodity when impaled upon said second set of blades longitudinally of said second set of blades into contact and across said third set of blades, and blade members lying in the plane of said second set of blades and forming extensions thereof whereby to complete the partial cuts made by said second set of blades when said commodity is impaled thereon.

2. A device for cutting relatively large sections of fruits and vegetables and other commodities or whole vegetables and fruits comprising a hopper adapted to receive commodities, fruits or vegetables, means forming a loading station including one or more plungers, means for feeding the commodity from the hopper to the loading station and on to the plungers, means for operating the plungers to project the whole commodity singly whereby to project single portions of the commodity, a first set of blades disposed in the path of projection of the commodity when projected by the plunger, said blades being disposed in spaced, parallel relation, each plunger having slots therein registering with the blades, a second set of blades disposed in spaced, parallel relation and arranged angularly in spaced relation to the second set of blades, means for actuating the first plunger to project the commodity entirely across the first set of blades and to impale the commodity partly upon the second set of blades whereby to hold the severed commodity upon said blades, one or more additional plungers disposed adjacent the second set of blades and adapted to move in a path parallel thereto to engage the commodity impaled upon said second set of blades, said second plunger or plungers having a plurality of slots therethrough, a third set of blades disposed beyond said second set of blades in the path of movement of the second plunger, said third set of blades disposed angularly with respect to said first and second set of blades, said plunger having additional slots registering with said third set of blades, said second set of blades having extensions adjacent said third set of blades and lying in the planes of said second set of blades for completing the partial severance made when said commodity is impaled upon said second set of blades, and means for operating said second plunger or plungers in synchronism with the withdrawal movement of said first set of plungers for projecting the commodity impaled upon said second set of blades, longitudinally across the extensions of said second set of blades.

3. In a device of the class described the combination of a cabinet having means forming an internal chamber, said cabinet having means forming a hopper adapted to receive a plurality of substantially whole fruits or vegetables to be cut, means for feeding the commodity from the hopper to the internal chamber, said internal chamber having an opening constituting a loading station into which the fruits or vegetables are fed, plunger means disposed in said cabinet below said opening for vertical reciprocation upwardly from said opening, said plunger means being adapted to receive a single fruit or vegetable thereon, a set of blades disposed vertically above and in the path of movement of said plunger, said first set of blades being disposed in spaced parallel relation, said first plunger having slots registering with said blades whereby to permit the passage of the commodity on said plunger entirely across said first set of blades, means for operating said plunger to project it toward and from said first set of blades, a second set of blades disposed in said cabinet in the path of movement of said first plunger, said second set of blades comprising parallel spaced-apart blade portions upon which the commodity is impaled by the movement of said plunger whereby to form partial lines of severance in said commodity extending partly transversely through the severed sections formed by the first blades, a second plunger adapted to be projected parallel to the planes of said second set of blades and thereacross, said second plunger having slots registering with the blades of said second set of blades whereby said plunger upon projection is adapted to engage the impaled commodity and to push it along said second set of blades, means for operating said second plunger in synchronism with the withdrawal movement of said first plunger, additional blades lying in the planes of said second set of blades whereby to complete the cuts entirely through said commodity formed by said second set of blades upon movement of the commodity by said second plunger, and a third set of blades lying in the path of movement of said severed commodity when projected by said second plunger and comprising a plurality of blades disposed to cut the severed sections into a plurality of smaller pieces.

4. A device for cutting fruits or vegetables into smaller pieces comprising a cabinet including an internal chamber, a plunger therein, means for feeding the commodity into position opposite the plunger, means for projecting the plunger to engage a commodity to feed it along a predetermined path, means for deflecting an additional fruit or vegetable from said plunger when the plunger is projecting a fruit or vegetable, cutting means disposed in the path of movement of the plunger projected fruit or vegetable adapted to form a complete line of severance through said fruit or vegetable while it is being projected, a second cutting mechanism disposed in the path of movement of the projected fruit or vegetable so cut upon which the fruit or vegetable is adapted to be partially impaled, a second plunger, means for projecting said second plunger across said second cutting means and parallel thereto to engage the impaled fruit or vegetable and move it at an angle to the path of movement of said fruit or vegetable by said first mentioned plunger, and cutting means disposed in the path of movement of the fruit or vegetable as projected by said second plunger and adapted to form complete lines of severance through said fruit or vegetable as moved by said second plunger.

5. In an apparatus for cutting relatively whole fruits or vegetables, plunger means for projecting substantially whole fruits or vegetables, spaced cutting means disposed in the path of projection of the fruit or vegetable completely to sever the same, additional spaced cutting means lying in the path of projection of the fruit or vegetable upon which the fruit or vegetable so severed is adapted to be partially impaled, said second cutting means being disposed angularly with respect to said first cutting means, a second plunger means adapted to project the fruit impaled on said second cutting means therealong and additional cutting means disposed in the path of projection of the fruit or vegetable as projected by said second plunger and including a cutting means registering with the impaling means to complete the partial lines of severance formed by the impaling means and adapted to form complete lines of severance therethrough whereby to cut the fruit or vegetable into a plurality of predetermined sections.

6. In a device of the class described the combination of means for moving a fruit or vegetable along a predetermined path, spaced cutting means disposed in the path of movement of said fruit or vegetable for severing the same into a plurality of pieces, additional cutting means positioned at an angle to the planes of the first said cutting means and disposed in the path of movement of the fruit or vegetable upon which said fruit or vegetable so severed is partially impaled, means for moving the impaled fruit or vegetable along said impaling means and additional cutting means disposed in the path of movement of the impaled fruit and disposed to complete the partial cuts formed by said impaling means whereby transversely to cut each of said plurality of pieces into a plurality of pieces.

7. A device of the class described comprising a cabinet, means forming an internal chamber, means for feeding a plurality of relatively whole fruits or vegetables into said chamber, a plunger disposed in said chamber upon which the mass of vegetables or fruits are adapted to lodge, means for projecting the plunger vertically, means for knocking off any additional fruits or vegetables except a single fruit or vegetable lodged on said plunger, cutting means disposed above said plunger in the path of movement of the plunger, said plunger having slots adapted to register with the cutting means whereby said fruit or vegetable may be projected by said plunger beyond said cutting means, additional cutting means above said first mentioned cutting means and angularly disposed with respect thereto, upon which the fruit or vegetable is partially impaled by the said plunger, a second plunger in said cabinet and adapted to engage the impaled fruit or vegetable and to move along said second cutting means, a third set of cutters disposed in the path of movement of the impaled fruit or vegetable and adapted to cut the severed sections of the fruit or vegetable as the latter is projected therethrough and means for operating the plungers in synchronized relation.

8. In a device of the class described the combination of support means, a tubular plunger adapted to receive a substantially whole fruit or vegetable thereon and adapted to engage the curved walls thereof, cutting means including a plurality of parallel cutters in spaced relation disposed in the path of movement of the plunger, said plunger having slots therein registering with the cutters whereby upon projection of the fruit or vegetable by the plunger said fruit or vegetable will be completely severed by said cutters and whereby said tubular plunger will substantially maintain the severed sections in assembled relation, and a second set of cutting blades disposed in the path of movement of said plunger and upon which the severed sections of said whole fruit or vegetable are adapted to be impaled by the movement of said plunger, said second set of blades being of such length as to terminate somewhat above the lower surface of the fruit or vegetable impaled on said blades whereby to leave an uncut section of each of said sections cut by the first mentioned set of blades and whereby to maintain said cut sections in assembled and impaled relation on said second set of blades.

9. In a device of the class described the combination of support means, a tubular plunger adapted to receive a substantially whole fruit or vegetable thereon and adapted to engage the curved walls thereof, cutting means including a plurality of parallel cutters in spaced relation disposed in the path of movement of the plunger, said plunger having slots therein registering with the cutters whereby upon projection of the fruit or vegetable by the plunger said fruit or vegetable will be completely severed by said cutters and whereby said tubular plunger will substantially maintain the severed sections in assembled relation, and a second set of cutting blades disposed in the path of movement of said plunger and upon which the severed sections of said whole fruit or vegetable are adapted to be impaled by the movement of said plunger, said second set of blades being of such length as to terminate somewhat above the lower surface of the fruit or vegetable impaled on said blades whereby to leave an uncut section of each of said sections cut by the first mentioned set of blades and whereby to maintain said cut sections in assembled and impaled relation on said second set of blades, and a second plunger means adapted to engage the fruit or vegetable sections impaled on said second set of blades and to move them longitudinally of said blades and cutting means disposed in the plane of said second set of blades for completing the lines of severance through said uncut portions.

10. In a device of the class described the combination of support means, a tubular plunger adapted to receive a substantially whole fruit or vegetable thereon and adapted to engage the curved walls thereof, cutting means including a plurality of parallel cutters in spaced relation disposed in the path of movement of the plunger, said plunger having slots therein registering with the cutters whereby upon projection of the fruit or vegetable by the plunger said fruit or vegetable will be completely severed by said cutters and whereby said tubular plunger will substantially maintain the severed sections in assembled relation, and a second set of cutting blades disposed in the path of movement of said plunger and upon which the severed sections of said whole fruit or vegetable are adapted to be impaled by the movement of said plunger, said second set of blades being of such length as to terminate somewhat above the lower surface of the fruit or vegetable impaled on said blades whereby to leave an uncut section of each of said sections cut by the first mentioned set of blades and whereby to maintain said cut sections in assembled and impaled relation on said second set of blades, and a second plunger means adapted to engage the fruit or vegetable sections impaled on said second set of blades and to move them longitudinally of said blades and cutting means disposed in the plane of said second set of blades for completing the lines of severance through said uncut portions, and additional cutters disposed angularly across said second set of blades, said second plunger having slots registering with said second set of blades and said third set of blades whereby upon projection of said second plunger said impaled commodity will be projected across said second set of blades and across said third set of blades.

11. In a device of the class described the combination of cutting means disposed in a predetermined plane, additional cutting means disposed in a plane angularly with respect to the plane of the first mentioned cutting means and spaced therefrom, means for forcing a piece of cuttable material across the first mentioned cutting means whereby to sever the same and to partially impale the severed pieces upon the second mentioned cutting means, means for forcing the impaled pieces along the second mentioned cutting means and means providing additional cutting means disposed in the plane of the second mentioned cutting means and forming extensions thereof in a direction to extend the cut formed by said second mentioned cutting means completely to cut through the first mentioned partially severed sections to cut them into smaller sections.

12. In a device of the class described, the combination of means for moving a fruit or vegetable along a predetermined path, spaced cutting means disposed in the path of movement of said fruit or vegetable for severing the same into a plurality of pieces, additional cutting means disposed in said path of movement of said fruit or vegetable upon which said fruit or vegetable so severed is partially impaled, said additional severing means being disposed at an angle to said first mentioned cutting means, means for moving the impaled fruit or vegetable along said impaling means and other cutting means disposed transversely to the plane of cutting of said first and second cutting means for still further sub-dividing the cut pieces of the fruit or vegetable cut by said first and second mentioned cutting means.

WILLIAM E. URSCHEL.
JOE RICHARD URSCHEL.